United States Patent [19]

Torphammar et al.

[11] 3,942,739
[45] Mar. 9, 1976

[54] SAFETY BELT CONSTRUCTION

[76] Inventors: Nils G. Y. Torphammar; Per G. Torphammar, both of Ostermalmsvagen 6, 61200 Finspong, Sweden

[22] Filed: May 23, 1974

[21] Appl. No.: 472,534

[30] Foreign Application Priority Data
July 30, 1973  Sweden............................. 7310467
May 24, 1973  Sweden............................. 7307287

[52] U.S. Cl........................................ 242/107.4 A
[51] Int. Cl.² ........................................ B65H 75/48
[58] Field of Search.................. 242/107.4, 107.7; 280/150.5; 297/386–388

[56] References Cited
UNITED STATES PATENTS
3,122,338  2/1964  Whittingham .................. 242/107.4
3,343,765  9/1967  Baker............................... 242/107.4

Primary Examiner—Leonard D. Christian
Attorney, Agent, or Firm—Eric Y. Munson

[57] ABSTRACT

A safety belt construction adapted for use as an automobile seat or shoulder belt providing normally desired freedom of movement to a wearer during normal driving with the belt snagged into a locked passenger retaining position upon a rapid change of speed or direction of the vehicle. A belt is wound on a spring biased rotatable drum, the spring tending to rotate the drum to wind the belt thereon. At relatively constant speed and direction, the belt may readily be unwound from the drum. However, upon a rapid change of direction or speed, ratchet teeth associated with the drum are engaged by a pawl preventing drum rotation and holding the belt tightly. The pawl is actuated to a drum locking position by a pendulum moving in response to rapid speed and direction changes.

8 Claims, 11 Drawing Figures

SAFETY BELT CONSTRUCTION

BACKGROUND OF THE INVENTION

This invention relates to the art of safety belts, and more particularly to an improved safety belt particularly adapted for use as a lap or shoulder restraining belt in motor vehicles.

The use of such automobile seat and shoulder belts though generally recognized as minimizing injury in vehicle collisions is resisted by many drivers because of the discomfort encountered in the use of these belts. Among the primary causes of discomfort is the fact that the wearer is restricted in movement not only during a collision, but also during normal driving.

BRIEF DESCRIPTION OF INVENTION

It is with the above considerations in mind that the present improved safety belt has been evolved, providing a desired degree of freedom of movement to the wearer during normal driving but snagging to a locked position in the event of a sharp change of speed or direction.

It is accordingly among the primary objects of the invention to provide a safety belt which will permit the wearer to move about to the extent normally desired during normal driving, but which snags to a locked position when the vehicle is subjected to rapid changes of speed or direction, such as occurs during a collision.

According to the invention, this and other objects which will appear hereafter are attained by training a belt around a spring biased rotatable drum with the spring biasing the drum to wind the belt thereabout. A ratchet wheel is secured to one end of the drum and a pawl is positioned to engage the ratchet teeth preventing rotation of the drum upon a rapid change of direction or speed of an automobile or the like in which the belt is employed. The pawl is moved to a ratchet engaging position by a pendulum coupled to the pawl, with a change in inertia of the pendulum moving the pawl.

A feature of the invention resides in the mounting of the pawl on a displaceable axis of rotation permitting pawl displacement during ratchet engagement to assure desired seating of the pawl with respect to the ratchet teeth.

Another feature of the invention resides in the provision of a cam surface on the pawl implementing return of the pendulum to a centered position.

BRIEF DESCRIPTION OF THE DRAWINGS

The specific details of the invention will be described in full, clear, concise and exact terms in conjunction with the accompanying drawings, wherein.

DESCRIPTION OF PREFERRED EMBODIMENTS

Referring now more particularly to the drawings, like numerals in the various FIGS. will be employed to designate like parts.

Figure 1:
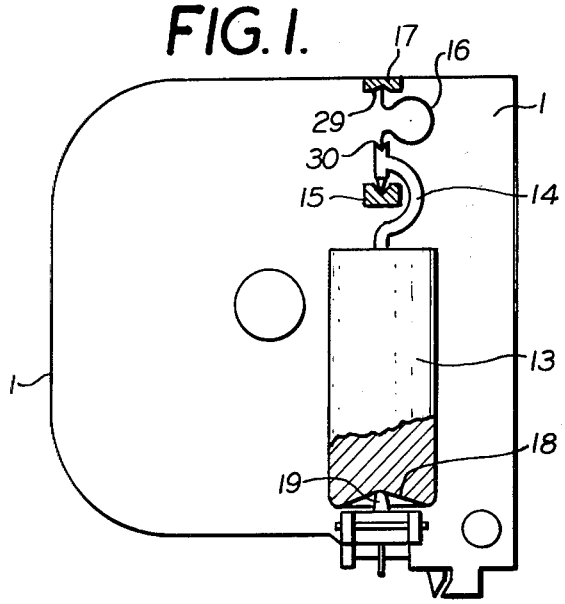
FIG. 1 is a side elevational view of a belt holder with the pendulum and fulcrum seat shown in partial cross-section.
Figure 2:
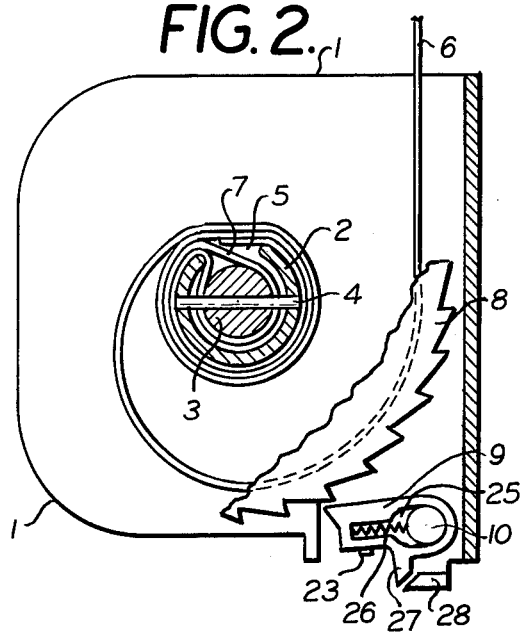
FIG. 2 is a view of the interior of the belt holder shown in FIG. 1, with parts broken away showing the drum, ratchet teeth, and pawl.
Figure 3:
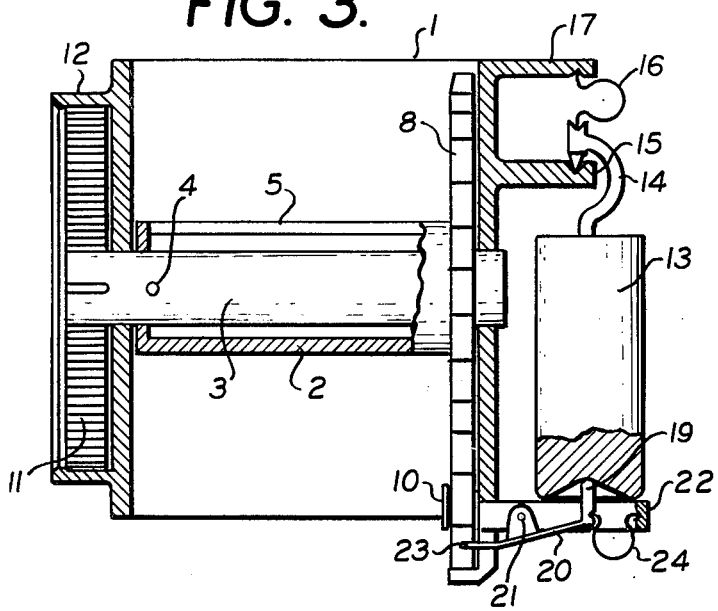
FIG. 3 is an end view at right angles to the FIG. 2 view with the pendulum and pivot arm rotated 90°.

As best seen in FIGS. 1-3, the safety belt construction embodying the invention is formed with a belt holder housing 1 in which a hollow drum 2, as best seen in FIGS. 2 and 3 is mounted on a rotatable shaft 3 rotatably supported between the side walls of the housing 1 as best seen in FIG. 3. A pin 4 secures drum 2 to shaft 3 for rotation therewith.

The hollow drum 2 is formed with a slot 5, and the belt 6 has one end secured with respect to the drum 2 by inserting a belt end into the drum 2 through slot 5. The inserted belt end is looped and shaft 3 inserted through the loop and drum. The belt end, drum and shaft are locked together by means of pin 4, as best seen in FIG. 2. As a result of this arrangement the belt may be replaced when worn.

Ratchet teeth are associated with the drum to permit control of drum movement. In accordance with the invention, a ratchet wheel 8, as best seen in FIGS. 2 and 3, is fixed to the drum 2. As will be apparent, the ratchet wheel 8 may either be fixed to the shaft or formed integrally with the drum. A pawl 9, as best seen in FIG. 2 is pivoted on shaft 10 in housing 1 adjacent the teeth of ratchet wheel 8.

A drum biasing torsion coil spring 11, as best seen in FIG. 3 is mounted in spring housing 12 at one end of housing 1. The outer end of spring 11 is anchored to spring housing 12 and the inner end of spring 11 is secured to drum shaft 3. The spring 11 is tensioned to resist the unwinding of the belt from the drum.

A pendulum 13 is mounted on a pivot arm 14, as best seen in FIG. 3. As illustrated pivot arm 14, is secured at its lower end to the center of the top of cylindrical pendulum 13, and is curved and formed at its other end with a point adapted to sit in fulcrum seat 15 formed on an extension from housing 1. The pivot point end of arm 14 is formed with a spring engaging recess opposed to the fulcrum point in which one end of spring 16 rests. The other end of spring 16 is engaged in casing projection 17, as best seen in FIG. 3, so that the spring 16 can act to bias the fulcrum point into fulcrum seat 15.

Figure 4:
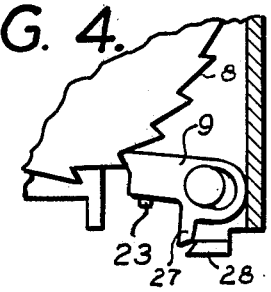
FIG. 4 is a detail elevational view of the pawl and ratchet in locked position.
Figure 6:
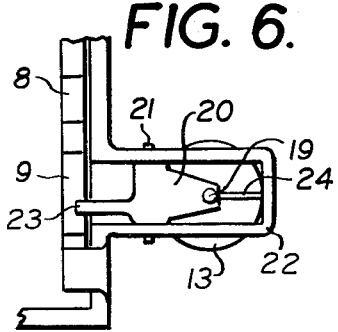
FIG. 6 is a detail view looking up at the lower right hand corner of the holder as viewed in FIG. 3 showing a plan view of the lever connection between pendulum and pawl.
Figure 7:
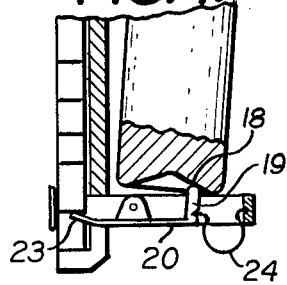
FIG. 7 is a detail elevational view of the lever seen in FIG. 6 in a position moving the pawl to a ratchet engaging position.

The lower end of pendulum 13, as seen in FIG. 3, is formed with a recess receiving a trunnion 19. Trunnion 19 is secured to one arm of a class 2 lever 20 pivoted at 21 on a U-shaped housing projection 22, as best seen in FIGS. 3 and 6. The other arm 23 of lever 20 is positioned beneath pawl 9 as viewed in FIGS. 2 and 4, so that when trunnion 19 is moved downwardly as viewed in FIGS. 3 and 7; lever arm 23 will move upwardly against pawl 9 to bring pawl 9 against ratchet teeth 8, as seen in FIG. 4. A biasing spring 24, as seen in FIGS. 3, 6 and 7, is arranged between the base of U-shaped projection 22 and trunnion 19.

Figure 5:
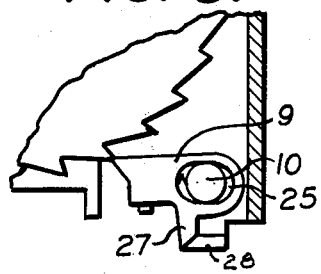
FIG. 5 is a detail elevational view of the pawl and ratchet in an undesired point to point position.

To insure desired engagement of the pawl 9 with respect to the ratchet teeth 8, proper positioning being shown in FIG. 4, and to prevent an undesired point to point engagement, as shown in FIG. 5, which may result in pawl or ratchet teeth breakage, the pawl 9 is formed with an oval bearing hole 25, as shown in FIG. 2. A compression spring 26 is arranged between the pawl shaft 10 and the pawl 9 with the spring 26 tending to bias the pawl to the FIG. 2 position but permitting pawl movement axially with respect to shaft 10. Additionally, the pawl 9 is formed with a cam arm 27 engaging fixed cam surface 28 on the housing, so that upon engagement of the pawl with the ratchet teeth, the rotation of drum 2 will move pawl 9 to engage cam surface 28, as seen in FIG. 5, causing the pawl to be positively displaced into desired seating engagement with ratchet teeth 8, as shown in FIG. 4.

Figure 9:
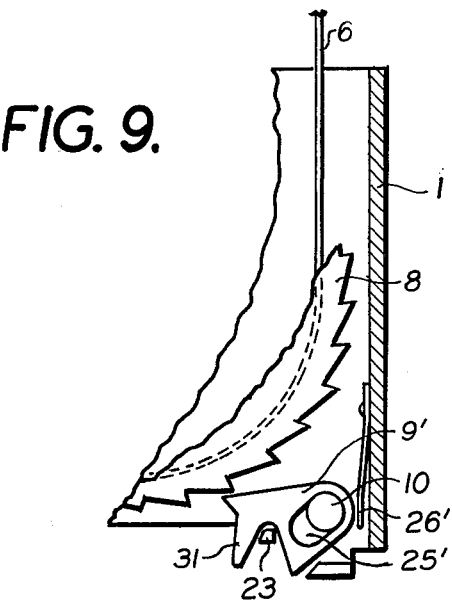
FIG. 9 is a detail elevational view of a modified pawl shown in an inactive position with respect to the ratchet teeth.
Figure 10:
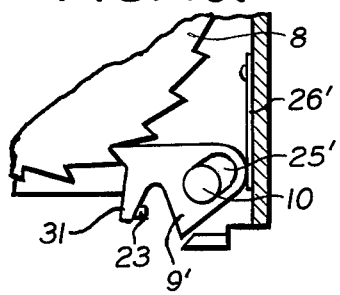
FIG. 10 is a detail elevational view of the modified pawl of FIG. 9 in ratchet tooth engaging position.
Figure 11:
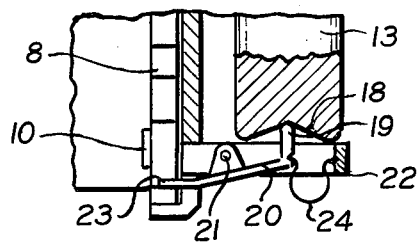
FIG. 11 is a detail view at right angles to the views of FIG. 9.

A modified pawl arrangement is shown in FIGS. 9–11 for implementing return of the pendulum to a central position. The modified pawl 9' is formed with a cam arm 31 engaged by lever arm 23. Bearing hole 25' is formed of an oval configuration, as seen in FIG. 9, with its axis extending obliquely. Thus, upon engagement of pawl 9', with ratchet teeth 8, the ratchet teeth will urge the pawl to move against the biasing action of pawl spring 26' to the position shown in FIG. 7, with pawl shaft 10 at the lower end of bearing hole 9. As a result of this pawl shift on shaft 10, cam arm 31 will ride against lever arm 23, urging it downwardly so that lever 20 will assume the position shown in FIG. 11 with the trunnion 19 centering pendulum 13.

OPERATION

In use, the belt assembly is formed as above described and where used in a vehicle, mounted to permit the belt to be trained either over the lap or shoulders of the wearer. The housing 1 may thus be positioned adjacent the seat or seat back. The free end of the belt is drawn out of the housing over the lap or shoulders of the user and anchored in conventional fashion.

During normal driving, pendulum 13 is centered as viewed in FIGS. 1 and 2, and pawl 9 is free of engagement with ratchet wheel 8, as viewed in FIGS. 2 and 9.

However, where there is a rapid change of inertia due to a rapid change of vehicle speed or direction, the pendulum, which is selected with a moment of inertia responsive only to the changes of speed or direction, regarded as critical, will be displaced from its central position swinging about the fulcrum provided by fulcrum seat 15, moving trunnion 19 downwardly as viewed in FIG. 7, to cause the lever arm 23 to move up against pawls 9 or 9' against the ratchet teeth 8.

Figure 8:
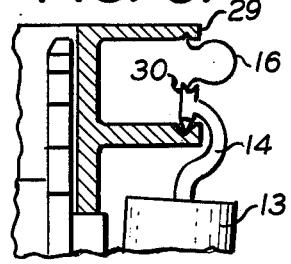
FIG. 8 is a detail elevational view of the upper end of the pendulum fulcrum when the pendulum is pivoted.

Spring 16 bearing against pendulum pivot arm 14 as best seen in FIGS. 1 and 8, has its center line shifted as a result of the pendulum movement and the spring provides an accelerating force urging the pendulum to swing in its direction of movement, and provide a biasing force tending to maintain the pendulum in its displaced position.

Similarly, spring 4, as best seen in FIGS. 3 and 7, has its center line shifted by the displacement of trunnion 19 and lever 20, accelerating the upward movement of lever arm 23 against the pawl.

Springs 16 and 24 thus provide a locking action, on one hand biasing the pendulum to a centered position, and when displaced from this centered position, biasing the pendulum to an off-center position. By selecting appropriate spring constants, the sensitivity of the locking action can be controlled.

When the vehicle speed or direction has become relatively constant, the pendulum returns to its centered position. The pawl 9 will be released from ratchet teeth 8 by the release of tension on belt 6 which permits drum 2 to be turned by drum biasing return spring 11, causing pawl 9 to be moved down by ratchet teeth 8. The downward movement of pawl 9 moves lever arm 23 down, raising trunnion 19 into pendulum recess 18, which is preferably conical so that the trunnion will center on the cone apex centering the pendulum 13. Springs 16 and 24 are simultaneously returned to their starting positions.

In the FIGS. 9–11 embodiments of the pawl, the pendulum is returned to its center line position simultaneously with the engagement of the pawl with the ratchet teeth, without requiring release of tension on the belt. As above described, the tension on the belt forces teeth 8 against pawl 9', shifting its position with respect to pawl shaft 10. The obliquely arranged bearing hole 25' permits the pawl to move with the ratchet a slight distance, simultaneously causing cam arm 31 to ride against lever arm 23 camming the lever arm down to raise trunnion 19 into seating position in recess 18 to center the pendulum.

The above disclosure has been given by way of illustration and elucidation, and not by way of limitation, and it is desired to protect all embodiments of the herein disclosed inventive concept within the scope of the appended claims.

What is claimed:

1. A safety belt assembly comprising: a belt; a spring biased rotatable drum on which said belt is wound; a spring for biasing said drum to wind said belt thereon; ratchet teeth associated with said drum; a pawl positioned for engagement with said ratchet teeth; and a pendulum coupled to said pawl to move same into locking engagement with said ratchet teeth preventing the belt from being unwound from the drum upon displacement of said pendulum; a lever; said pawl being coupled to said pendulum by said lever, one arm of which engages said pawl, and the other arm of which is subject to movement by said pendulum; said pendulum being formed with a recess at its lower end; said recess having walls converging to an apex; and said lever being formed with a trunnion seating in said recess.

2. A safety belt assembly as in claim 1, including a second spring mounted to bias said pendulum alternatively to a centered or off-centered position.

3. A safety belt assembly as in claim 1, including a second spring mounted to bias said lever alternatively to a pendulum centering position or a pawl actuating position.

4. A safety belt assembly comprising: a belt; a spring biased rotatable drum on which said belt is wound; a spring for biasing said drum to wind said belt thereon; ratchet teeth associated with said drum; a pawl positioned for engagement with said ratchet teeth; and a pendulum coupled to said pawl to move same into locking engagement with said ratchet teeth preventing the belt from being unwound from the drum upon displacement of said pendulum; said pawl being formed with an oval bearing hole; a pawl shaft in said bearing hole; a spring between said pawl and said pawl shaft biasing said pawl to a position where one end of said oval bearing hole contacts said shaft permitting shifting of said pawl after engagement with said ratchet teeth to insure desired interengagement between said pawl and said ratchet teeth.

5. A safety belt assembly as in claim 4 in which said pawl is formed with a cam leg; a cam surface adjacent said cam leg, whereby, upon shifting of said pawl or said shaft, said pawl will be urged into desired seating relationship with said ratchet teeth.

6. A safety belt assembly as in claim 1 in which said pawl is formed with a cam surface engaging said lever.

7. A safety belt assembly as in claim 6 in which said pawl is formed with an oval bearing hole and a circular bearing shaft in said hole.

8. A safety belt assembly as in claim 7 in which said oval bearing hole has a longitudinal axis parallel to a tangent to said ratchet teeth.

* * * * *